United States Patent [19]

Samworth

[11] Patent Number: 5,260,806
[45] Date of Patent: Nov. 9, 1993

[54] PROCESS FOR CONTROLLING TONE REPRODUCTION

[75] Inventor: Mark R. Samworth, Wilmington, Del.

[73] Assignee: E. I. Du Pont de Nemours and Company, Wilmington, Del.

[21] Appl. No.: 726,461

[22] Filed: Jul. 8, 1991

Related U.S. Application Data

[63] Continuation-in-part of Ser. No. 573,071, Aug. 29, 1990.

[51] Int. Cl.$^5$ ............................................. H04N 1/40
[52] U.S. Cl. .................................... 358/456; 358/458; 358/500
[58] Field of Search ................. 358/456, 458, 459, 75, 358/429

[56] References Cited

U.S. PATENT DOCUMENTS

| | | | |
|---|---|---|---|
| 4,149,183 | 5/1976 | Pellar et al. | 358/75 |
| 4,472,736 | 9/1984 | Ushio et al. | 358/75 |
| 4,654,721 | 3/1987 | Goertzel et al. | 358/456 |
| 4,667,250 | 5/1987 | Murai | 358/283 |
| 4,792,979 | 12/1988 | Nomura et al. | 358/458 |

OTHER PUBLICATIONS

A Computer Program For Tracing Tone Reproduction Diagrams Appearing In The Proceeding Of The Trade Association For The Graphic Arts, Taga, 1974, p. 192.
Principles Of Color Proofing By Michael Bruno, Published By Gama Communications, Salem, N.H., 1986 On pp. 333–334.

*Primary Examiner*—Edward L. Coles, Sr.
*Assistant Examiner*—Anh-Vinh Nguyen

[57] ABSTRACT

The principal task in graphic arts reproduction is to convert input images, such as continuous tone original images, into output images, such as half-tone images, to permit, for instance, the creation of half-tone prints on a printing press. In this process, tones (i.e., shades of gray) from the original image are typically altered or affected in two important ways. First, the printing conditions substantially affect production of an optimized half-tone representation (or match copy) of the original continuous tone image. Second, the operator often needs to modify certain tones from that in the original to bring out more or less detail to achieve a desired artistic effect. This invention allows the operator to determine and adjust for printing conditions and original tone quality in a particular system and under a particular set of operating conditions, thus greatly reducing the time-consuming experimentation that operators have previously had to endure to obtain acceptable results.

9 Claims, 3 Drawing Sheets

PROCESS FOR CONTROLLING TONE REPRODUCTION

CROSS REFERENCE TO RELATED APPLICATION

This is a continuation-in-part application of copending U.S. patent application Ser. No. 07/573,071 filed Aug. 29, 1990.

BACKGROUND OF THE INVENTION

1. Field of Invention

This invention relates to a process for controlling tone reproduction of an output image and, more particularly, to a process for controlling tone reproduction in generating an output image by correlating a basic gradation transfer function and a plurality of sets of gradation coeffients to a set of visual sample images representing a closest visual reproduction and visual enhanced reproductions of an input image.

2. Description of Related Art

In monochrome half-tone image reproduction, various shades of gray appearing in a continuous tone original image are reproduced on paper by a single tone ink. To simulate the multiple shades of gray in the original, the continuous tone image is converted into a half-tone image. Half-tone images comprise a plurality of different size dots of a uniform optical density level. The human eye integrates the dots with the background and is fooled into believing that it sees a multiplicity of continuous tone gray shades, the apparent gray level being a function of the size of the dots per unit area.

Prior to the wide-spread use of computers, to make a half-tone image from a continuous tone one, a screening process was used. In that process the original was photographed, using high contrast photographic films known as litho films, to produce a half tone transparency. A large graphic arts camera was used, and the litho film was exposed through, preferably, a glass screen. The effect of the intervening screen was to produce an image on the litho film which was no longer a continuous tone image, but which consisted of a multiplicity of different size dots of substantially uniform density, the dot size being a function of the screen and optical image density at any point on the original.

The half-tone transparency is next used to make a printing plate. Typically this process involves exposing to radiant energy through the half-tone transparency a photosensitive oleophilic or hydrophilic layer coated on a support. As a result of this exposure, and subsequent development, the printing plate contains a pattern of dots representing the continuous tone image. This plate in turn is mounted on a printing press, the dots are inked, and the ink is transferred on a receiving sheet of paper or other material, reproducing the dot pattern and thus the image.

As can be readily understood, in the reproduction process, the dot sizes from the half-tone transparency through the inking and printing process often change in size and shape, depending on a number of variables, beginning with the degree collimation of the actinic radiation source used to expose the printing plate through the half-tone transparency, through the degree of contact between the separation and the plate, the amount of ink applied by a particular inking system in the press, the amount of pressure in the ink transfer step in the printing step and finally the nature, surface quality and absorbency of the receiving medium.

The task of properly selecting the dot sizes in the half-tone transparency is further complicated because it is often desired not to simply reproduce a print in which the gradation levels are an exact reproduction of the original, but to further adjust for desired tone scale reproduction. For instance, the operator is often required to enhance the original image as photographed, as a result of changes requested by a customer, to bring out certain details in the print or tone down others depending upon the desired effect.

A certain amount of flexibility in the half-tone transparency creation step was available to the operator in the form of variable exposure time. The result of such variable exposure was to produce smaller or larger dots than those expected through the correct exposure of the litho film, allowing the operator to compensate for the dot gain or loss in the subsequent printing steps and to introduce intentional alterations in response to a customer's instructions regarding print appearance. This process is one of trial and error based on operator experience and involved substantial experimentation.

Attempts at a scientific approach to predictably adjust the size of dots in the half-tone transparency to compensate for various printing conditions through the use of graphing techniques (e.g., developing various transfer curves correlating calculated dot size to original image density, and dot-gain prediction and/or measurement techniques (such as discussed in Appendices C and D of *Principles of Color Proofing* by Michael H. Bruno, published by GAMA Communications, Salem, N.H., 1986 edition, pages 333 et seq.) have met with limited success due in part to the multiplicity of variables introduced in the various steps described above.

With the advent of computers and the ability to handle images digitally, one now has the opportunity to generate half-tone transparencies through an electronic screening process in a computer system. While this technology allows a greater degree of flexibility in selecting the dot size produced on the half-tone transparencies, the selection of actual dot sizes to represent shades of gray with predictable results following printing in a particular printing set-up remains a problem.

In a typical digital image environment, there are three steps involved in generating the half-tone transparency. First, a continuous tone image is scanned in a scanner-digitizer. The scanner-digitizer breaks up the continuous tone image into a plurality of tiny individual picture elements (Pixels), each having an assigned numerical value related to the optical density of the picture element. Second, this numerical data is sent for processing in an image processing stage or system. The image processing system generates a driving signal. Third, a recorder receives and is driven by the driving signal which produces the transparency. In some applications, the recorder may produce a printing plate directly, omitting the formation of an actual transparency. In these applications, a virtual, rather than an actual, transparency exists in the form of numeric data supplied to the recorder. In other applications, the driving signal may produce an output image on a video display terminal.

There are a number of algorithms available in the art for generating half-tones from continuous tone data. U.S. Pat. No. 4,654,721 issued to Goertzel et al. and U.S. Pat. No. 4,667,250 issued to Murai provide good examples of this technology. Use of these algorithms will create a pattern of dots covering a desired percentage of a given unit area. The difficulty lies in determining what actual percentage dot coverage is needed to be created on the half-tone transparency per unit area for each of the optical densities in the original to accurately and predictably reproduce the original optical image density range or gamut, following printing, in a particular printing set-up. Further, before the data is processed by the half-tone algorithm and fed to the recorder, it must also be processed so that the printed image which will result from the use of the half-tone transparencies produced by the recorder either (1) will be an exact representation of the original continuous tone image as defined below or (2) will differ from the original by a preselected, predictable degree.

Known tone reproduction techniques which attempt to achieve this, follow several approaches. According to one of the approaches, a continuous tone image is scanned and an algorithm representing a preset generic half-tone density transfer function correlating half-tone transparency dot sizes and original densities based on preestablished non-user specific printing conditions is capable of being applied to the scanner output data to produce a print. A plurality of additional fixed preselected half-tone density transfer functions which produce prints differing from the print produced by the generic transfer curve are also available, which when applied to input data, produce half-tone transparencies that result in prints that differ from the original in appearance. The data may be corrected in real time, or may be stored in a memory for later access. The problem with such a system is that it lacks adaptability to particular press conditions which tend to vary from shop to shop and may be significantly different from the preset non-user specific conditions used in the generic half-tone density transfer function or algorithm applied.

As individual operator's printing conditions vary, there is need for extensive experimentation by each operator before the operator can use the preset settings to produce acceptable results with any degree of confidence. Furthermore, the operator must use his or her personal judgment and experience in choosing the particular gradation correction from those available, based on the original image quality and his or her printing conditions. The process is both time-consuming and expensive.

According to another approach, an existing system endeavors to employ a user-specific transfer algorithm or function which provides a half-tone transparency resulting in a print from a specific press and under specified printing conditions such that the print is an "exact" replica of the original continuous tone image. This method overcomes one of the major drawbacks of the previously described system. That is, it uses a transfer function which is user-specific. The system provides separate controls for selecting the basic transfer function and desired tone reproduction shifts. However, to achieve a desired altered tone reproduction from the original, this system still requires the operator to experimentally determine by how much to alter the basic transfer function each time to obtain a desired print appearance. The user is often at a loss to determine the proper adjustment of control settings to change the algorithm to accomplish a desired result since he has no guidance except his personal experience as to the effect of the various possible settings. Further, over the course of several jobs, it is often difficult to keep track of the series of changes made to accomplish a desired result should it be requested again.

In yet another approach, a system employs a set of user-specific basic transfer functions. Each one of the basic transfer functions provides a half-tone transparency resulting in a print under a different set of printing conditions such that the print is an "exact" replica of an original continuous tone image. In addition, a family of fixed preselected alternative transfer functions corresponding to each basic transfer function is available. Each one of the additional functions is adapted to produce a print differing in appearance from the print produced by the corresponding basic transfer function and the other additional functions corresponding to that basic transfer function. This system includes a user interface comprising a single tone reproduction control. All available basic transfer functions and additional associated transfer functions are grouped together and selected through this single control. Operators mentally decide their operating conditions and tone reproduction choices, then search through the vast number of options available on the single control. This is time consuming and confusing.

Thus, there is still need in the art for a method or process which will allow a user to produce an output image from an input image which will result in the output image having a predictable relation to the input image without undue experimentation or special knowledge.

SUMMARY OF THE INVENTION

It is an object of this invention to provide a process for controlling tone reproduction in an output image from an input image under a set of image reproduction conditions, comprising:

(a) establishing a basic transfer function unique for the image reproduction conditions, the basic transfer function correlating measured optical densities of a sample input image having a range of optical densities and corresponding optical densities of a sample output image of the sample input image, such that the sample output image generated under the image reproduction conditions from an output of the basic transfer function is an exact representation of the sample input image;

(b) establishing a plurality of preselected sets of coefficients corresponding to the basic transfer function, the sets of coefficients when applied to the output of the basic transfer function produces a modified output, such that the output image generated under the image reproduction conditions from the modified output is a non-exact representation of the input image which differs in gradation from the input image by a predetermined amount; and (c) correlating the basic transfer function and the set of coefficients to a set of visual sample output images such that a user can select the gradation of the output image to be generated and the corresponding basic transfer function and/or the set of coefficients by determining which sample output image has gradation characteristics closest to desired gradation characteristics for the output image to be generated under the image reproduction operating conditions.

As the invention is most often applied, the original input image is a monochrome continuous tone image and the output image is a half-tone image with its color being black and white.

DESCRIPTION OF THE PREFERRED EMBODIMENTS

Figure 1:
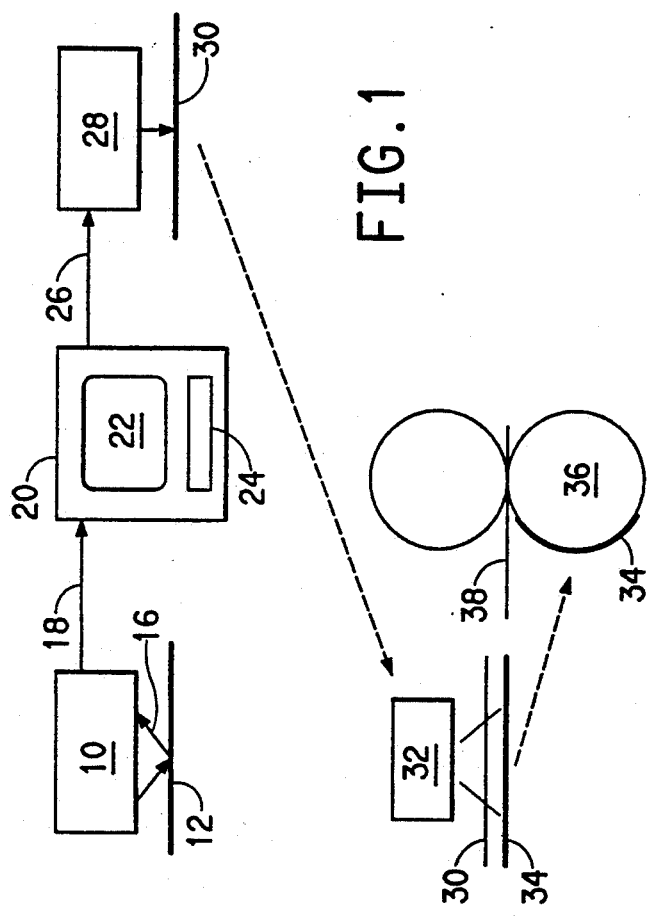
FIG. 1 shows in schematic representation a typical image reproduction system in which the present invention may be practiced.

Referring now to FIG. 1, there is depicted in schematic format a particular image reproduction system or set-up useful in explaining the present invention. Such set-up may comprise a scanner/digitizer 10 which is used to read an original input image 12 typically by directing and scanning a light beam 14 onto the image and detecting the reflected (or transmitted) beam 16 from the input image 12. The scanner/digitizer 10 may further be able to digitize the detected beam 16 output. In an 8 bit digital system, the digitized image will have discrete values ranging from 0 through 255 for each of the picture elements into which the image is broken down to, the pixel size being a function of the resolution abilities of the scanner/digitizer 10. This range of digital values corresponds to the gamut or range of optical densities in the original image. A typical black and white photograph has an optical density gamut or range (defined as the difference between the maxumum optical density and the minimum optical density) of about 1.8.

The output of the scanner/digitizer 10 can then be directed over a line 18 to a digital signal processor unit 20, which may include a central processing unit (CPU) and appropriate software to process the image data prior to sending it over a line 26 to a recorder 28 or other output device. The CPU may perform a number of functions in addition to processing image data in accordance with the present invention. It may include keyboard means 24 to allow an operator to input instruction or additional information, and may include display means 22 to facilitate the communication process between the operator and the CPU. The display means 22 may be a video display terminal for displaying an output image representative of the original input image.

The output of the recorder 28 can be an actual half-tone transparency 30 or an actual print. However, as explained above, for the purposes of the present invention, the transparency need not be produced in a film or on a substrate by a recorder or printer, but could remain as data representing the transparency or output image in the system in which case such data is a virtual transparency or virtual output image. The half-tone transparency 30 is used in an exposure unit 32 to expose a lithographic printing plate 34. Following exposure, the plate 34 is developed in equipment not shown herein, then mounted on a printing apparatus 36 where it is used to print a reproduction or copy of the original image onto a receiving medium or substrate 38 referred to as a print.

Regardless of the apparatus and method employed, input data repesentative of the optical density $D_o$ of each picture element or pixel in an orignal image is obtained or generated. The data can be obtained from a system like the one described in reference to FIG. 1 or any other system or method. The data representative of the input image can be created from one or more electronically stored image(s) or entirely computer generated.

In developing a user-specific system in which a virtual or actual image having predictable preselected characteristics is generated, we separate or divide the operations performed on the input data representing the input image into two distinct categories or steps.

Establishing a Basic Transfer Function

The first step or set of operations on the input data is to establish a basic transfer function unique for a set of image reproduction conditions. In the preferred embodiment, a plurality of the basic transfer functions are established for a plurality of image reproduction conditions. The basic transfer function(s) can be optionally stored in, for instance, the processor unit 20.

In the case where the output image is a hard copy print, typical image reproduction conditions include the type of printer, receiving medium and ink to be used. For instance, one set of image reproduction conditions for generating an output image which is a print comprise using coated paper on a particular sheet fed press with non-heat set (or drying oil) inks. Another set includes using uncoated paper (such as newsprint) on a particular web fed press with heat set inks. In the case of an output image displayed on a video display terminal, typical image reproduction conditions comprise brightness range of the cathode ray tube (CRT), the gamma of the CRT and the viewing conditions (e.g., brightness of the viewing room).

The basic transfer function is established by correlating measured optical densities of a sample input image having a range of optical densities and corresponding optical densities of a sample output image of the sample input image, such that the sample output image generated under the image reproduction conditions from an output of the basic transfer function is an "exact" representation of the sample input image. When the output density range is less than the input density range, a mathematically exact reproduction can not be achieved. However, for the purposes of this invention, the term "exact" means the closest visual reproduction of the imput image. Other terms used in the art for "exact" representation include "match copy", "optimum visual reproduction" and "optimized representation". The basic transfer function is, thus defined such that when applied to the input data representing an input image, an output image reproduced on a user specified set-up will be generated with the the optical density range or gamut in the input image the same or substantially the same as in the output image. What is meant by the above can be illustrated by and further understood from the following example.

Assume that a continuous tone original input image has a maximum optical density of 2.0 and a mimimum optical density of 0.2, then the total density range in the original image is 1.8. Assume further that the particular printing or image reproduction system to be used to make a half-tone print of the continuous tone original image can only produce a maximum apparent optical density (i.e., the density of a solid ink area) of 1.6 and a mimimum apparent optical density (i.e., the density of a no ink or unprinted area of a receiving medium) of 0.1, then the spread or gamut of the apparent optical densities of a half-tone print made on the image reproduction system is 1.5. As a result, any optical density in the original continuous tone image will be reproduced in the half-tone print with a half-tone dot area whose apparent optical density range is different, i.e., less, than the total optical density range as the total optical density of the original image.

Figure 2:
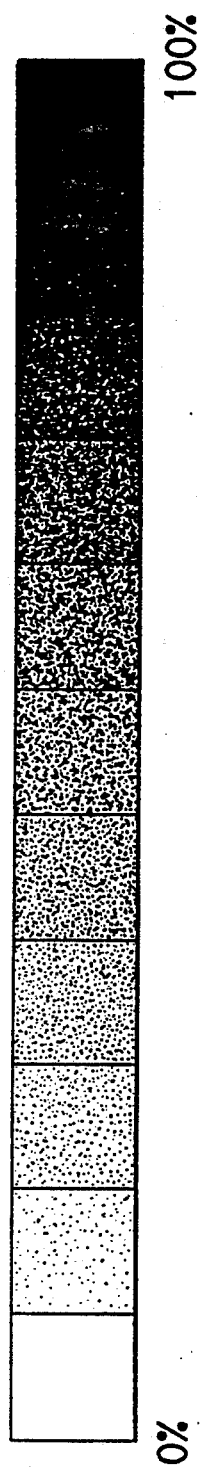
FIG. 2 shows a typical calibration test target or pattern adapted for use on a half-tone test transparency in the present invention.

The following is an example showing how to establish a basic transfer function for one particular set of image reproduction conditions. Using the particular set of image reproduction conditions for which the basic transfer function will be developed, a half-tone transparency comprising a test pattern or target of the type shown in FIG. 2 is used to expose and produce a lithographic printing plate of the type used in the particular printing set-up for which the basic transfer function is being developed. The test pattern has at least 4 and preferably 11 distinct areas which are represented in corresponding percent dot areas (% Dt) in the transparency, ranging from 0% to 100% in uniform increments of 10%. The plate is then mounted on the printing press of the particular printing set-up or system and using the chosen operating conditions (e.g., the particular receiving medium and the desired ink), a print is made.

Figure 3:
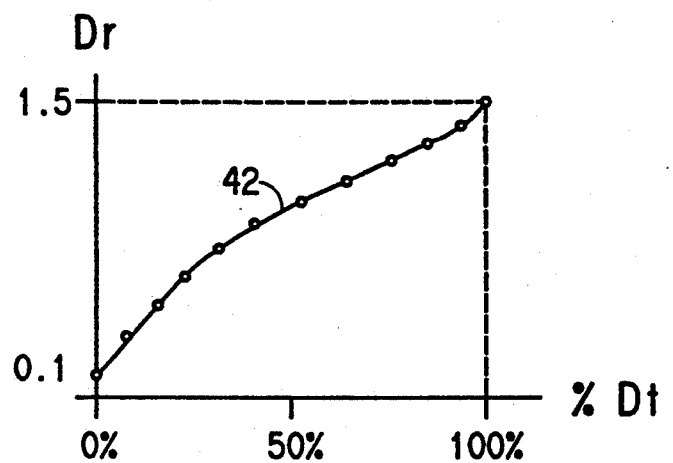
FIG. 3 shows in graphical representation apparent optical densities ($D_r$) of areas of a print corresponding to percent dot areas (% Dt) of a half-tone test transparency like that of FIG. 2.

The apparent optical densities ($D_r$) for the 11 different dot size areas in the printed image of the test target or pattern are then measured with a diffuse reflection densitometer. FIG. 3 shows in graphical format the results of these measurements. In this example, the top apparent optical density of the print is measured as 1.5, and the background apparent optical density of the print was 0.1, thus the half-tone print has a range of apparent optical densities of 1.4. These measured apparent optical density values ($D_r$) from the print and corresponding percent dot areas (% Dt) of the transparency are introduced to the CPU where they are stored and a third order polynomial function is calculated representing a best fit curve to the introduced values such that a corresponding % Dt is obtained when the function is applied to a specific $D_r$. In FIG. 3, this function is shown for description purposes as a solid curve 42 connecting the measured $D_r$ values versus % Dt values. In the computer, however, the function resides as an algorithm correlating reflected print densities ($D_r$) to % dot area (% Dt) in the transparency.

Figure 4:
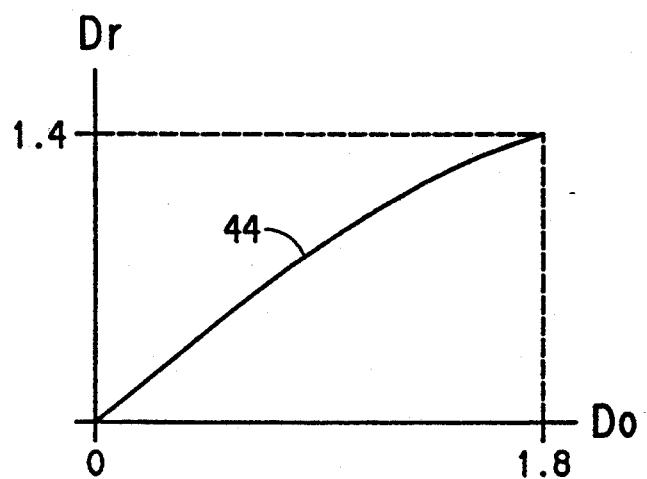
FIG. 4 shows in graphical representation the resulting relationship between printed apparent optical densities ($D_r$) and original image optical densities ($D_o$) obtained in accordance with the teachings of the present invention.

The problem is to correlate the range of reflected print apparent optical densities ($D_r$) to the range of the original image optical densities ($D_o$). Using a typical photographic print density range, e.g., 1.8 (a preselected value stored in the computer), or, preferably, the optical density range of the specific input image, a new relationship represented by the curve 44 in FIG. 4 is derived correlating the 1.4 print density range illustrated in FIG. 3 to the 1.8 density range of the original input image.

The relationship or curve 44 is developed by first converting the original optical density range (e.g., 1.8) and the print apparent optical density range (e.g., 1.5) to darkness units $V_o$ and $V_r$, respectively, using, for instance, an equation derived from the Bartleson-Breneman equation, as follows:

$$V = 1.1123 * [1 - [[10^{-D} + 1.0103]/1.0103]^{0.5}] \quad (1)$$

where
V = darkness units and
D = Optical density units.

Second, a plurality of the original optical densities $\{D_o1, D_o2, \ldots D_on\}$ are converted to darkness units $\{V_o1, V_o2, \ldots V_on\}$ using, for instance, equation (1). Third, the darkness units $\{V_o1, V_o2, \ldots V_on\}$ are then multiplied by the darkness ratio $V_r/V_o$ resulting in values $\{V_r1, V_r2, \ldots V_rn\}$. Fourth, the values $\{V_r1, V_r2, \ldots V_rn\}$ are converted back to optical density values $\{D_r1, D_r2, \ldots D_rn\}$ using, for instance, equation (1). A plot of the range of values of printed densities ($D_r$) versus the range of original densities ($D_o$) and a joining of intersecting points results in the relationship or curve 44 as shown in FIG. 4.

With the above information it is now easy to determine the basic transfer function, i.e., the relationship between the output image, that is reproduced using the image reproduction conditions, considered an "exact" or substantially "exact" duplicate of the input image as defined above. Graphically the process is explained with reference to FIG. 5, in which FIGS. 3 and 4 have been combined back to back.

Figure 5:
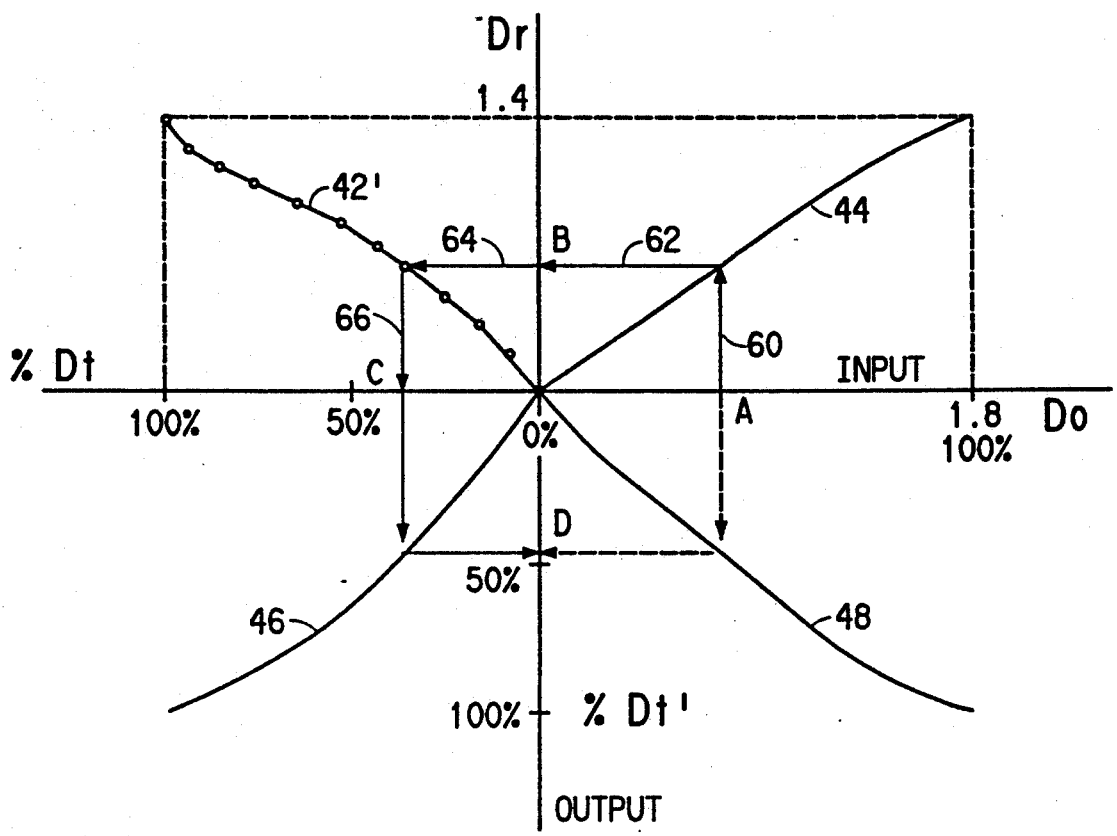
FIG. 5 shows in graphical representation the manner in which the relationships shown in FIGS. 3 and are combined back to back and used in the present invention.

As each original pixel value is retrieved to be sent to, for instance, a recorder for generation of the corresponding half-tone transparency, the pixel value undergoes the following modifications. Assume one of the original optical densities $\{D_o1, D_o2, \ldots D_on\}$ is identified by the letter "A". Referring to FIG. 5, "A" is converted to "B", a corresponding one of the optical density values $\{D_r1, D_r2, \ldots D_rn\}$ as described above. This can be graphically illustrated by following the arrow 60 from $D_o = A$ in FIG. 5 to where it intercepts curve 44 and then following arrow 62 to obtain the apparent optical density ($D_r$) that must be printed to give the desired result. To print this optical density ($D_r$), we find the point where the arrow 64 intercepts curve 42' (the mirror image of curve 42) and then follow arrow 66 to obtain the percent dot area in the transparency (% Dt) or value "C", corresponding to the half-tone to be generated on the transparency. A 45 degree straight line could be used to transfer this % Dt value "C" to the Output axis shown. Optionally, instead of a straight 45 degree line (because the recorder output is often used as an intermediate half-tone transparency from which a final half-tone transparency is made for use in plate making), a further correction curve 46 which compensates for this intermediate exposure step may be used. In either case, a % Dt' value "D" is obtained. One uses this process for a multiplicity of original optical density values $\{D_o1, D_o2, \ldots D_on\}$ and constructs a basic transfer function or curve 48 which may then be used to determine any percentage dot area (% Dt') for a corresponding original optical density value ($D_o$).

In a computer environment, the above steps occur in a mathematical transfer algorithm, rather than in the graphical format used above to described the process.

In summary, each original pixel optical density value $D_o$ is first converted to a darkness value $V_o$ using equation (1). It is then multiplied by the darkness ratio $V_r/V_o$ which is the darkness value corresponding to the reproduced density range (e.g., $V_r=0.865$) divided by the darkness value corresponding to the original density range (e.g., $V_o=0.933$). The result is converted back to a density value "$D_r$". "$D_r$" can then be used in a 3rd order polynomial relationship % $Dt=f(D_r)$ to represent the curve 42 fitting the test points to give the percent dot % Dt required to reproduce this pixel's original density $D_o$ after printing. This value may be further corrected by a small factor if the half-tone transparency is to be used as an intermediate, depending on the intended use, to compensate for the slight dot gain (or loss) that may occur driving the copying of the one transparency onto another. The combination of the various mathematical algorithms described above is the basic transfer function. A multiplicity of such basic transfer functions may be developed and stored in an addressable memory bank representing basic transfer functions for various image reproduction conditions, to be used when preparing transparencies or other output images for use with each of the conditions.

Establishing Coefficients to be Applied to the Output of the Basic Transfer Functions In addition to developing a basic transfer function, there is often need to produce a half-tone print so that it differs from the continuous tone original image in one of a number of preselected desired manners. For example, it may be desirable to provide extra detail over a certain portion of the original densities ($D_o$) while compressing the balance or otherwise alter the tone or gradation curve of an original image. In this manner, one may want to emphasize the highlights (lighter), midtone or shade (darker) portions of an input image, for example, to obtain a different more desirable appearance in the output image or print than would be obtained using the basic transfer function alone.

To this purpose, the process of the present invention includes establishing a plurality of preselected sets of coefficients corresponding to each one of the established basic transfer functions. Each set of coefficients corresponding to each basic transfer function when applied to the output of the corresponding basic transfer function produces a modified output, such that the output image generated under the image reproduction conditions from the modified output is a non-exact representation of the input image which differs in gradation from the input image by a predetermined visual amount. Preferably, the sets of coefficients are stored in a selectable accessible memory. Depending on the desired effect, a set of the coefficients may be selected and a corresponding one of the coefficients used to mathematically modify the output of the corresponding basic transfer function (which is in units of percent dot value (% Dt)) for each pixel prior to supplying the driving signal, such as, to the recorder 28. The modified output values corresponding to each set of the coefficients effectively comprise a modified transfer function relating original input density values Do to percent output density values % Dt'.

Figure 6:
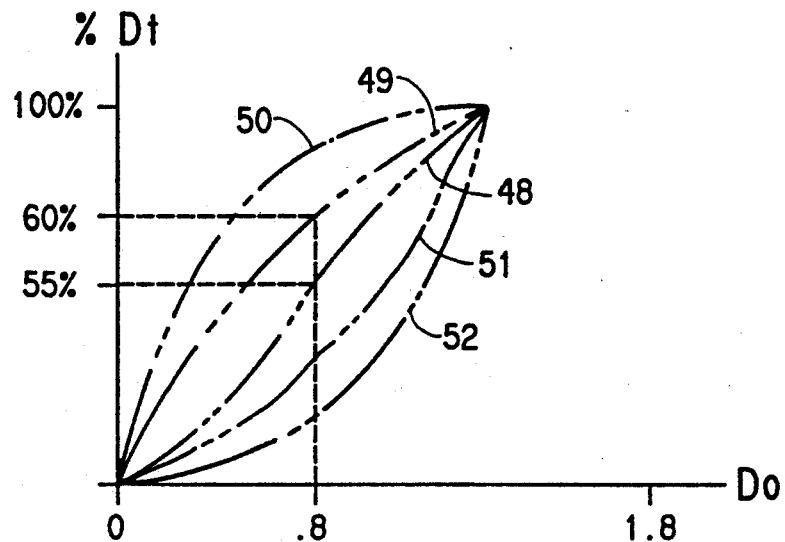
FIG. 6 shows how a set of coefficients used in the present invention may be developed using, in graphical representation, percent dot area (% Dt) versus original optical densities ($D_o$).

FIG. 6 shows how such a set of coefficients may be developed. Starting with a basic transfer function established as described above, a user decides how to alter a portion of a reproduced density range. For example, the user may decide to provide greater detail in lighter portions of a printed output image in comparison to an original input image. In this case, the user wants to modify the output of the basic transfer function 48 to appear as a new modified transfer function 49. To obtain a set of coefficients useful in modifying the basic transfer function 48 a user may proceed as follows. Assume for each optical density $D_o$ of the original, the curve 48 gives a % Dt value to be used for an "exact" half-tone copy representation of an original continuous tone image. Thus, if 0.8 is the optical density $D_o$ of one pixel in the original image, as a result of using curve 48 in FIG. 6, a 55% dot value will be called for on the corresponding area of the transparency to make an exact half-tone copy representation of the pixel in the original continuous tone image. However, if we now want to use the new curve 49, the 55% dot value must be modified from the value provided from the basic transfer function 48. In this example, the value from the basic transfer function 48 is multiplied by a coefficient from a set of coefficients derived by obtaining the difference between the % dot value (% Dt) corresponding to use of curve 48 and the % dot value (% Dt) corresponding to the use of curve 49 and then calculating the corresponding multiplication factor or coefficient. In this instance, this factor is (60% Dt/55% Dt)=1.1. The same process may be used for a number of other optical densities, to obtain, for instance, four multiplication factors or coefficients and then extrapolate between those multiplication factors or coefficients to obtain intermediate multiplication factors or coefficients. The coefficients may also be applied to the basic transfer curve through other functions as explained above, rather than multiplication. For instance, the new calculated point may equal the value as calculated from the basic transfer function, plus, minus or divided by a numerical value representing the desired % Dt change. Alternatively, the coefficients may be determined from equations derived using the logic described above.

The coefficient sets (that correspond to each basic transfer function) correspond to a number of preselected tonal modifications, which preferably are standardized tonal shifts (or modifications), which are described by various curves 49, 50, 51 and 52 differing from the basic transfer function in the manner illustrated in FIG. 6. In the preferred embodiment, a family of standardized curves and corresponding sets of coefficients may be adapted to provide standardized modifications to the original image. Alternatively, the coefficients may be established by the user based on the type of effect he or she wants to produce and are used to further modify the basic transfer function (or the corresponding computer algorithm values applied to the data) to provide predictable results representing preselected gradation variations as follows.

Correlating the Basic Transfer Functions and the Set of Coefficients to Sets of Visual Sample Output Images The basic transfer functions and the sets of coefficients are correlated to sets of visual sample output images such that a user can select the gradation of the output image to be generated and the corresponding basic transfer function and/or the set of coefficients by determining which sample output image has gradation characteristics closest to desired gradation characteristics for the output image to be generated under the image reproduction operating conditions. The sample output images can be generated under a different set of image reproduction conditions with a different basic transfer function than the one(s) established in the first step of the present invention. However, the sample output images are preferably generated using the same sets of coefficients established in the second step of the present invention.

Selecting What Output Image to Generate Based on the Set of Visual Sample Output Images The customer or operator determines which of the sample output images best represents the type of change to the original input image desired. More specifically, the operator selects whether to generate an "exact" representation of the input image or one of the non-exact representations of the input image based on the set of visual sample output images. This selection can be made through use of the keyboard means 24 or other input means to the processor unit 20. Preferably, the selecting step comprises selecting the image reproduction operating conditions with a first control and selecting the gradation characteristics corresponding to the selected sample image with a second control.

Printing a Final Half-Tone Print from any Continuous Tone Image

Then using the basic transfer function and/or the set of coefficients, if any, corresponding to the selected sample output image, an output image is generated under the image reproduction conditions based on the selection. In one case, the input image comprises a continuous tone original image and the sample output images comprise half-tone representations. For instance, the continuous tone original image may comprise a black and white continuous tone image. In this case, the generating step comprises using the basic transfer function and/or the set of coefficients corresponding to the selected half-tone representation to generate a half-tone transparency for the continuous tone original image such that a printed half-tone image from the generated half-tone transparency would be an "exact" copy of or differing from the original image in a manner and degree that the selected half-tone representation represented the continuous tone original sample image. In other words, the result is a half-tone transparency which makes a plate that prints an image having predictable characteristics. The resulting half-tone transparency as noted above can be either a virtual or actual transparency.

The present invention is equally applicable to whether the output images are half-tone or continuous tone images. Further, the present invention is equally applicable to whether an actual output image, a virtual output image or a video display image is produced.

Those skilled in the art having the benefit of my invention hereinabove set forth may effect various modifications thereto. The invention has been illustrated using a monochrome example, specifically a black and white continuous tone image. However, the same principles may be applied to images comprising more colors than one. These modifications are to be construed as being encompassed within the scope of the present invention as claimed in the appended claims.

What is claimed is:

1. A process for controlling tone reproduction in an output image from an input image under a set of image reproduction conditions, comprising:
   (a) establishing a basic transfer function unique for the image reproduction conditions, the basic transfer function correlating measured optical densities of a sample input image having a range of optical densities and corresponding optical densities of a sample output image of the sample input image, such that the sample output image generated under the image reproduction conditions from an output of the basic transfer function is an exact representation of the sample input image;
   (b) establishing a plurality of preselected sets of coefficients corresponding to the basic transfer function, the sets of coefficients when applied to the output of the basic transfer function produces a modified output, such that the output image generated under the image reproduction conditions from the modified output is a non-exact representation of the input image which differs in gradation from the input image by a predetermined amount; and
   (c) correlating the basic transfer function and the set of coefficients to a set of visual sample output images such that a user can select the gradation of the output image to be generated and the corresponding basic transfer function and/or the set of coefficients by determining which sample output image has gradation characteristics closest to desired gradation characteristics for the output image to be generated under the image reproduction conditions.

2. The process of claim 1, further comprising selecting whether to generate the exact representation of the input image or one of the non-exact representations of the input image based on the set of visual sample output images.

3. The process of claim 2, further comprising generating the output image under the image reproduction conditions based on the selection.

4. The process of claim 3, wherein:
   the input image comprises a continuous tone original image and the sample output images comprise half-tone representations; and
   the generating step comprises using the basic transfer function and/or the set of coefficients corresponding to the selected half-tone representation to generate a half-tone transparency for the continuous tone original image such that a printed half-tone image from the generated half-tone transparency would be an exact copy of or differing from the original image in a manner and degree that the selected half-tone representation represented the continuous tone original sample image.

5. The process of claim 4, wherein the continuous tone original image comprises a black and white continuous tone image.

6. The process of claim 1, wherein:
   in step (a) a plurality of the basic transfer functions are established for a plurality of image reproduction conditions; and
   in step (b) a plurality of the preselected sets of coefficients are established corresponding to each of the basic transfer functions.

7. The process of claim 2, wherein the selecting step comprises selecting the image reproduction conditions with a first control and selecting the gradation characteristics corresponding to the selected sample image with a second control.

8. The process of claim 1, wherein the output image is a virtual image or an actual image.

9. The process of claim 1, wherein the output image is a printed image, a transparency or a video display image.

* * * * *